United States Patent

Co

[19]

[11] Patent Number: 4,699,580
[45] Date of Patent: Oct. 13, 1987

[54] BLOWN FILM TUBE DIAMETER CONTROL APPARATUS

[76] Inventor: Yee tiat O. Co, 2 Macedonia St., San Francisco, Calif. 94110

[21] Appl. No.: 807,960

[22] Filed: Dec. 12, 1985

[51] Int. Cl.$^4$ .............................................. B29C 47/92
[52] U.S. Cl. ..................................... 425/140; 137/223; 264/40.1; 264/563; 264/569; 425/72 R; 425/326.1; 425/387.1
[58] Field of Search ...................... 425/72 R, 135, 140, 425/141, 326.1, 327, 387.1, 388; 264/40.1, 40.3, 564, 566, 569, 209.2, 563; 137/596, 223, 224

[56] References Cited

U.S. PATENT DOCUMENTS

| | | | |
|---|---|---|---|
| 3,024,404 | 3/1962 | Ziffer | 425/141 X |
| 3,125,616 | 3/1964 | Cook et al. | 264/40.3 |
| 3,492,386 | 1/1970 | Ohmasa et al. | 425/327 X |
| 3,771,931 | 11/1973 | Fischer et al. | 425/72 R |
| 3,853,448 | 12/1974 | Yazawa | 425/72 R X |
| 4,069,292 | 1/1978 | Herrington et al. | 425/72 R X |
| 4,140,460 | 2/1979 | Carlsen | 264/40.3 X |
| 4,189,288 | 2/1980 | Halter | 264/40.3 X |
| 4,192,637 | 3/1980 | Chong | 425/140 |
| 4,265,853 | 5/1981 | Havens | 425/72 R X |
| 4,479,766 | 10/1984 | Planeta | 425/72 R |

FOREIGN PATENT DOCUMENTS

| | | | |
|---|---|---|---|
| 2658518 | 6/1978 | Fed. Rep. of Germany | 264/569 |
| 895704 | 5/1962 | United Kingdom | 425/72 R |
| 479650 | 11/1975 | U.S.S.R. | 425/141 |

Primary Examiner—Richard L. Chiesa
Attorney, Agent, or Firm—Douglas E. White

[57] ABSTRACT

A workpiece position control apparatus, specifically an apparatus for controlling the diameter of blown film tube, is disclosed. The apparatus includes at least one fluid nozzle, pressure sensing means for signalling the pressure of a fluid passing through the at least one nozzle and impinging on a workpiece when the workpiece is in a first position and for signalling the pressure of the impinging fluid when the workpiece is in at least one second position, and controlling means for adjusting the position of the workpiece in response to signals from the pressure sensing means.

14 Claims, 9 Drawing Figures

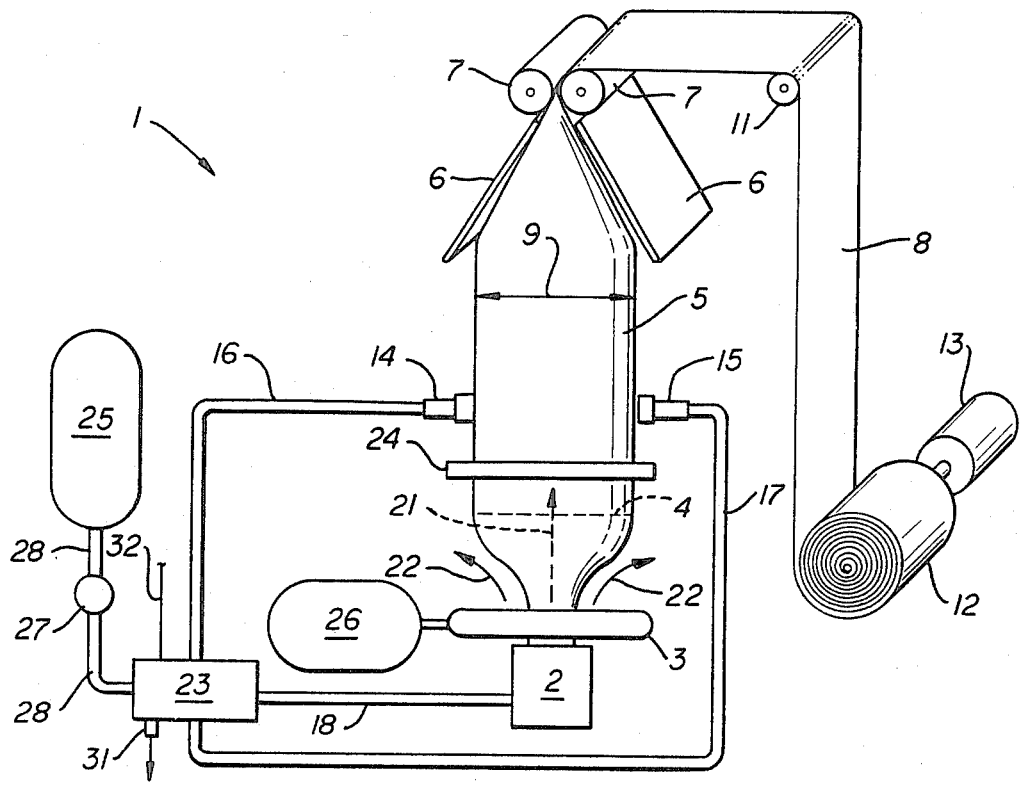
FIG._1.
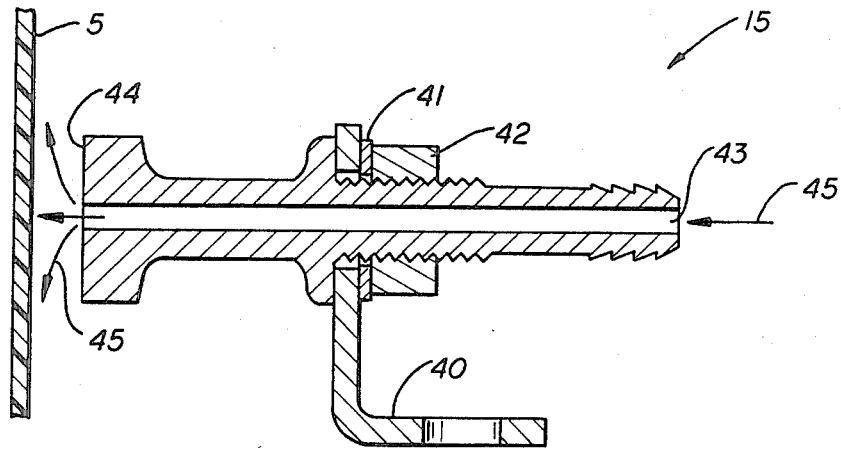
FIG._2.

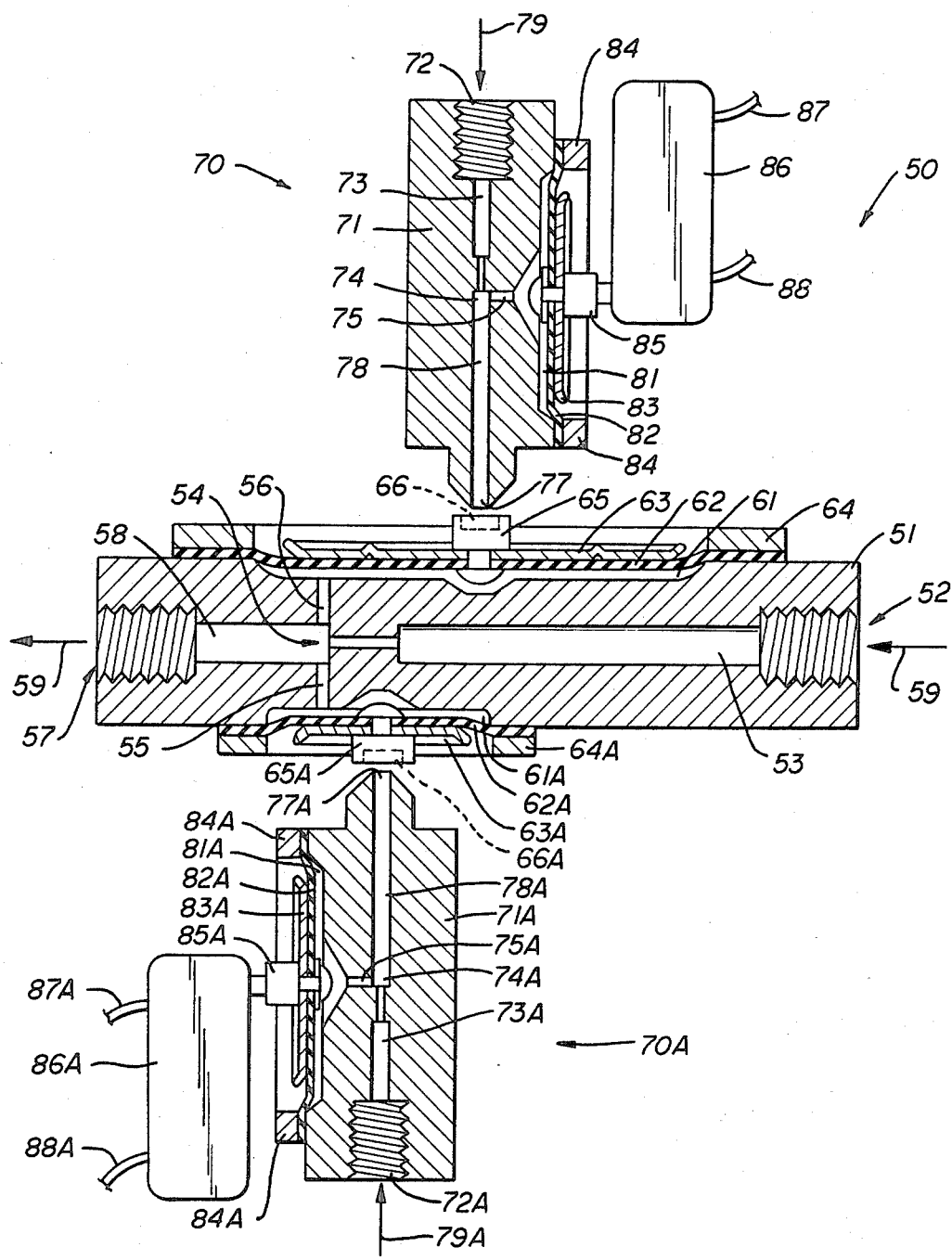
FIG._3.

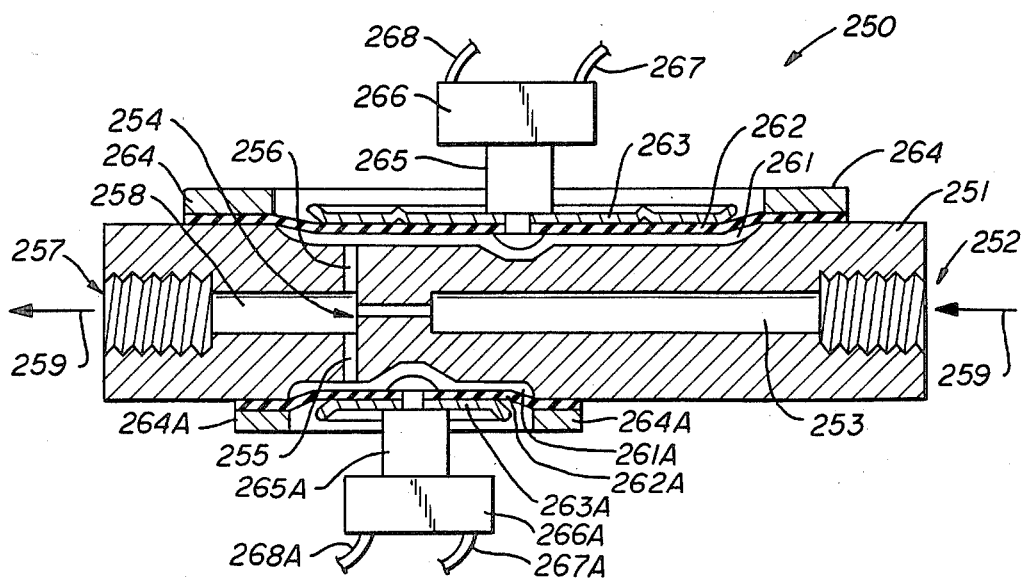
FIG._4.
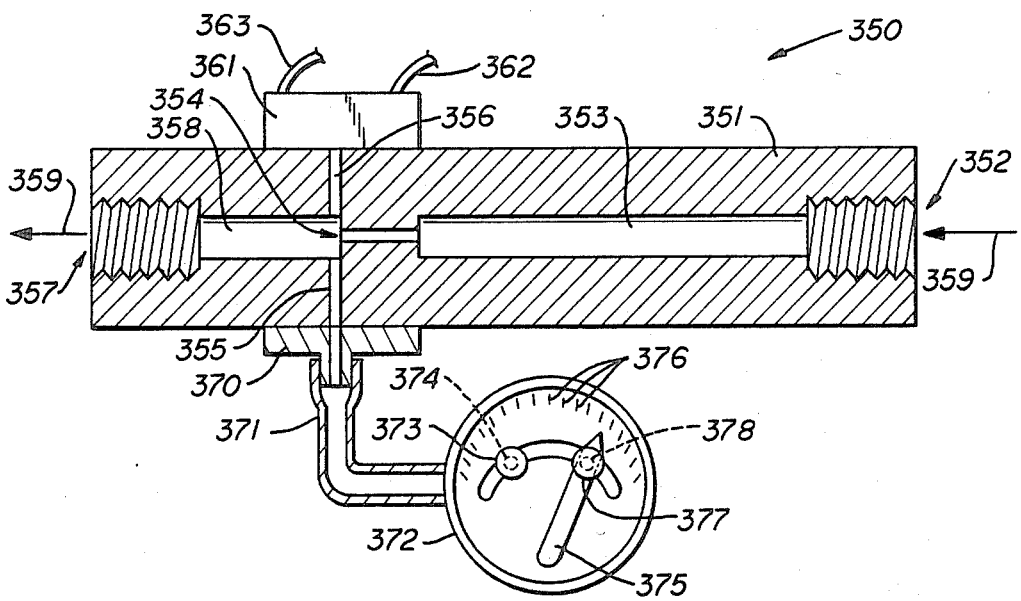
FIG._5.

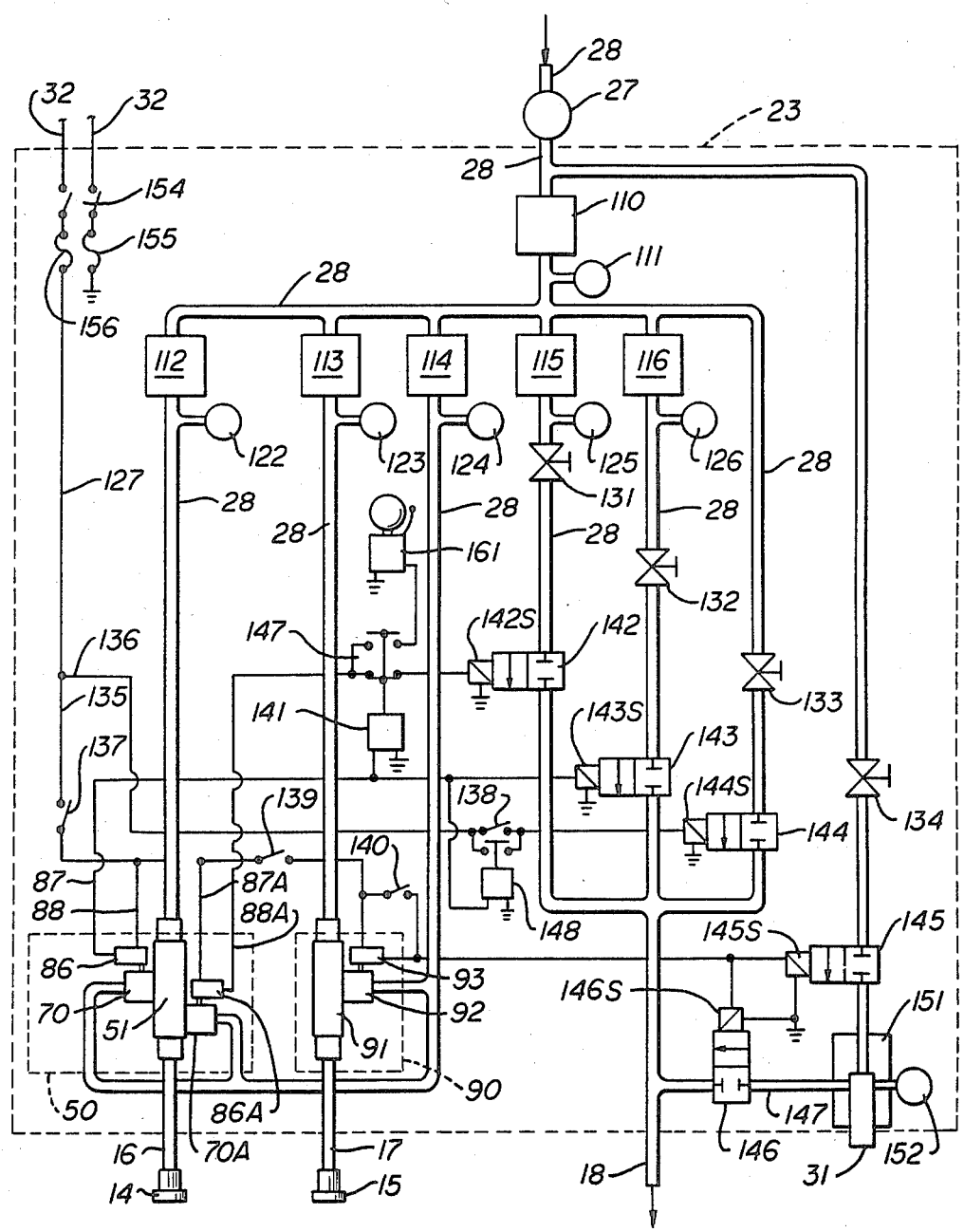
FIG._6.

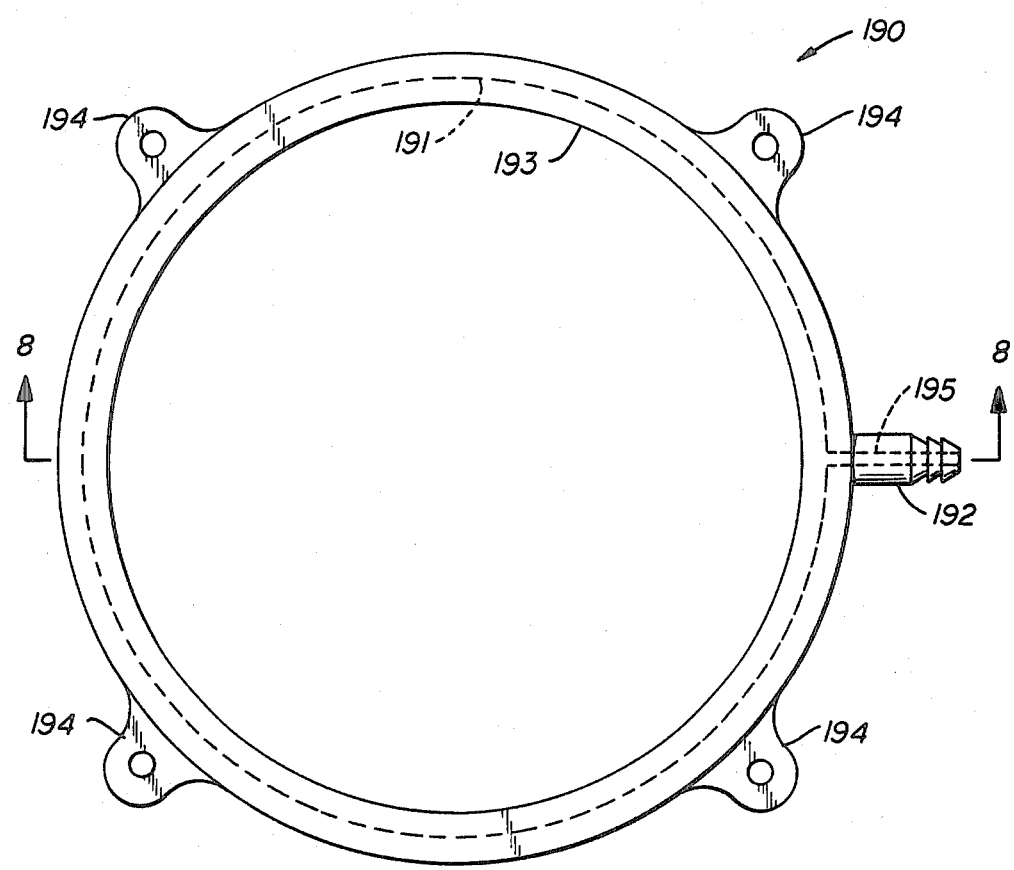
FIG._7.
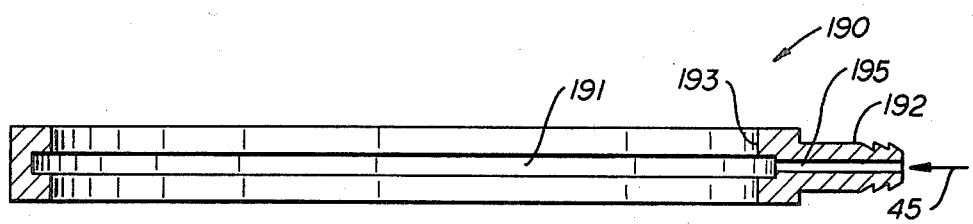
FIG._8.
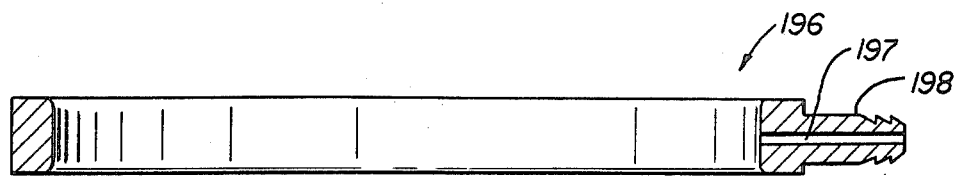
FIG._9.

BLOWN FILM TUBE DIAMETER CONTROL APPARATUS

FIELD OF THE INVENTION

This invention relates to apparatus for making plastic bags and other materials by the blown film tube method, more particularly to a pneumatic apparatus for using the same for measuring and controlling the film tube diameter as the tube is being blown.

BACKGROUND OF THE INVENTION

Plastic film or foil is commonly produced by blowing air into a molten plastic tube extruded from an annular opening of a blown film extruder die and cooling the extruded plastic as it expands into a bubble. Cooling of the molten plastic bubble is done by blowing air from an air ring external to the melt or through a combination of simultaneous external and internal cooling. Internal cooling can be done only with a die of a large diameter, where there is sufficient space available inside the annular opening of the die for passage of air into and out of the bubble. The cooled expanded tube is then passed in between two collapsing boards which form an acute angle before being taken up by two nip rolls. The nip rolls press the tube into a two layer web which is subsequently passed to a motorized winder.

As the flattened tube is taken up by nip rolls, a small amount of air is trapped between the two layers of film. Air from the blown film is thus slowly removed and this causes the diameter of the tube to diminish slowly, thus reducing the layflat width from the desired standard. The loss of air is greater for gusseted film tube and zipper locking types of tube. In locations where the day and night temperatures vary by a significant margin, the tube size will also vary unacceptably.

For large dies with internal cooling, the balancing of air flowing into and out of the bubble is absolutely necessary to maintain the bubble size. This flow balancing device also functions as a film tube diameter control system. Such a device is described in U.S. Pat. No. 4,140,460 to R. A. Carlsen. The air flow balancing control provides a proximation control method for tube diameter. To such a tube diameter control design, a layflat width measurement and associated computerized detection apparatus was added by H. Halter in U.S. Pat. No. 4,189,288.

These devices were designed for large capacity machines or machines for producing large diameters. This does not solve the problem of controlling tube diameter in small machines which use the small dies.

For small die machines, existing quality control methods make use of the measurement of the layflat width downstream of the nip rolls after the tube has been collapsed and flattened into a two layer web by the nip rolls. There is a time delay such that while the film tube is being expanded, a measurement downstream still reflects the former width. Similarly, when the film tube is shrinking, downstream measurement still incorrectly reflects the "right" width. Such a method will produce a constantly fluctuating width of film unless a complex correlation is made with the film speed, and unless a position follower is installed to follow the movement of film from side to side. The cost of this system is often unacceptably high.

The most logical method is to measure or detect the film tube diameter during the forming process. This method is direct and instantaneous. However, the bubble or the film tube itself is very soft. Air pressure inside the tube is low, about one inch of water, i.e. 0.036 psi (pounds per square inch) or less above ambient, depending on the thickness and material used. In addition, due to the blowing air, the tube is constantly moving or is in slight vibration. These factors have prevented simplified direct measurement solutions in small die systems prior to the mechanism of the present invention.

SUMMARY OF THE INVENTION

The present invention is a pneumatic or pressure sensing apparatus for controlling the blown film process which makes use of two adjustable position air nozzles as contact or proximity pressure sensors. These are installed above the frost line (the area where molten plastic becomes solid) opposing one another across the diameter of the film tube in the region where the film is still hot. An iris ring or a basket or any device that can hold the bubble and prevent it from swaying is installed below the nozzle. One nozzle is positioned in light contact with the film tube wall and is for undersize detection. Another nozzle is positioned at a distance from the film tube wall and is for oversize detection. The nozzles are supplied with air from their respective emitter or pressure sensing devices. The air leaking from the undersize nozzle also serves as a lubricant for the nozzle, preventing scoring of the hot film tube.

When the film tube diameter shrinks, a gap is created between the undersize detection nozzle and the film tube. A distance of more or less 0.005 inch is sufficient to trigger a switch to open a solenoid valve to introduce low pressure air into the bubble to return the tube to the desired size. If shrinkage continues (due to, for example, the presence of a pinhole on the tube) to a distance of 1/16 inch, more or less, this will trigger a switch to introduce medium pressure air to reinflate the bubble faster and activate a delay relay or timer at the same time. If after a preset time the bubble does not return to the correct size, high pressure air will be introduced to inflate the bubble at an even faster rate. The mechanism thus provides a dual range of undersize detection and three correction speeds.

If the film tube diameter overexpands, the tube will come into contact with the oversize nozzle. When this nozzle is covered, partially or completely blocking air otherwise flowing freely from it, the pressure change thus induced will switch on a suction device to suck air out of the tube and thus reduce the tube diameter to the correct size.

Another important aspect of the invention is the pressure amplification transducer assembly. This assembly makes use of the Bernoulli Principle involved in the measurement of the pressure change caused by flow of a fluid across an orifice. Amplification of a low pressure signal is done in two stages. The pressure built up across a first orifice moves a diaphragm, to the center of which is riveted a stopper, which blocks the outlet of another orifice flow device operating at higher pressure. The blockage of the second orifice flow device creates a pressure across the second orifice sufficient to move a second diaphragm far enough to actuate a microswitch.

The pressure amplification transducer is primarily intended for externally cooled plastic film control using stationary or oscillating dies. Nevertheless, detection of film tube diameter by the pressure sensor nozzles of the present invention can be incorporated into other systems of film tube size control utilizing both internally and externally cooled systems.

FEATURES AND ADVANTAGES

An object of this invention is to provide a direct, effective, economical and reliable method of detecting and controlling the film tube or bubble diameter when using the blown film tube method of producing plastic film bags and similar products.

Another object of the invention is to fill the needs of small machine systems, which outnumber large machine systems, and where the installation of presently available sophisticated control apparatus is not economical.

Another object of the invention is to provide a dual range control mechanism whereby rapidly increasing errors can be corrected at a greater rate than slowly occurring errors.

Yet another objective of the invention is to provide a control apparatus whose operation does not require computerized support devices.

Yet another object is to provide a very low maintenance control apparatus for the blown film industry.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention. It is also expressly understood that the distances of reaction from the nozzles are also described for illustrative purposes and are not intended as a limit of the invention.

BRIEF DESCRIPTION OF THE DRAWING

FIG. 1 is a part schematic, part perspective view of an embodiment of my invention showing placement of the detection nozzles and control box with respect to a blown film tube apparatus;

FIG. 2 is a sectional view of a sensing nozzle attached to a mounting bracket;

FIG. 3 is a part sectional, part schematic view of the preferred embodiment of an undersize pressure amplification transducer assembly;

FIG. 4 is a part sectional, part schematic view of an alternate embodiment of an undersize pressure amplification transducer assembly;

FIG. 5 is a part sectional, part schematic view of another alternate embodiment of an undersize pressure amplification transducer assembly;

FIG. 6 is a schematic view of the interior of the control box of FIG. 1;

FIG. 7 is a top plan view of a pneumatic sizing ring;

FIG. 8 is a sectional view of the sizing ring of FIG. 7 taken along the line 8—8 of FIG. 7; and FIG. 9 is a sectional view of a sizing ring similar to the ring of FIG. 7, but without an air channel.

DESCRIPTION OF THE PREFERRED EMBODIMENT

A blown film tube apparatus, generally designated 1, is shown in FIG. 1. Molten plastic from an extruder flows into die head 2 which has an annular opening on its top. The molten plastic feed apparatus and the internal components of die 2 are known in the art and are omitted from the drawing for purposes of clarity. The plastic forms a thick circular tube as it flows out of the die and passes inside the external air cooling ring 3. Air 22 supplied by a blower 26 or similar air supply is passed out of the air ring 3 to cool off the molten plastic externally. The tube is drawn up to be squeezed by the nip rolls 7. Air 21 from an external supply 25 is introduced into the interior of the plastic by an air hose 18 to blow up the plastic into a hollow bubble. This process will stretch and reduce the thickness of the plastic into a thin film, forming the film tube 5. The film tube 5 passes into the collapsing boards 6 to be flattened and to be taken up by nip rolls 7. The flattened two layer web 8 thus formed is passed over air idler roll 11 to be wound into a roll 12 by motor 13. The frost line 4, the boundary where the plastic begins to solidify, is shown in FIG. 1 as a dotted line. The construction and operation of this much of the blown film tube apparatus 1 is known in the art.

In the preferred embodiment, an iris ring 24 is adjusted to the same size as the tube 5 to prevent the tube from swaying while in the vicinity of pressure sensitive detection nozzles 14 and 15 which are positioned across the desired diameter 9 of the film tube 5. Air jet nozzle 14 is in light contact with the tube for undersize diameter detection purposes while air jet nozzle 15 is positioned at a set small distance from the tube for oversize diameter detection purposes. Air hose 16 connects nozzle 14 to the control box 23 and air hose 17 connects nozzle 15 to the control box 23. Compressed air is supplied to the control box 23 by air line or hose, generally designated 28. Electricity is connected to the control box 23 by line 32. An air exhaust 31 is connected to line 18 to reduce air volume inside the film tube when oversize correction is desired.

Shown in FIG. 2 is a cross sectional view of detection nozzle 15. Detection nozzles 14,15 are of congruent configuration. Low pressure air 45 passes into the nozzles 14,15 at inlet 43 which has a hose fitting for the connection of air hoses 16,17. Each nozzle 14,15 is bolted to a bracket 40 by lock washer 41 and nut 42 for adjustable connection to a support frame (not illustrated) surrounding the elements of tube apparatus 1. Air 45 flows out of the planar nozzle outlet face 44 which serves as a contact surface for film tube 5. The position of each nozzle 14,15 is adjustable to conform to the desired tube diameter 9 to be produced. Once put into position, however, the nozzles remain in fixed position until it is desired to produce a different size film. Air 45 leaking from the nozzle will serve as a lubricant when the film tube 5 comes into contact with the nozzle. If desired, the outlet face contact surfaces of the nozzle 14,15 can be covered with wear resistant material or low friction material such as tetrafloroethylene.

FIG. 3 is a cross sectional view, taken from the top, of the pressure amplification transducer assembly 50 for undersize detection purposes. The central venturi block or body 51 of assembly 50 serves as a base for pneumatic transducers 70 and 70A to be attached. Low pressure air 59 of about 0.1 to 0.2 psi goes into the central block 51 through inlet 52 where a threaded port is provided for the attachment of a hose fitting. The air then goes into passage 53 and on to venturi 54.

From the venturi orifice 54 air flows into enlarged passage 58 and out of outlet 57 where a threaded port is also provided for the installation of a hose fitting. Passages 53 and 58 combine to form a central air or fluid passage. Air 59 then passes from the hose fitting to the air hose 16 and finally to the undersize detection nozzle 14. At the exit of venturi 54 are two perpendicular lateral branch passages 55 and 56. If nozzle 14 is fully open (out of contact with tube 5), air 59 flows freely from inlet 52 past the orifice 54. This creates a low partial vacuum within the branches 55 and 56 according to the well-known Bernoulli principle. If nozzle 14 is blocked by contact with tube 5, the flow of air 59 ceases or slows and pressure will build up in the two branches 55 and 56 to nearly equal to that of the air pressure at inlet 52. The branch 56 is connected to the large cylindrical first stage diaphragm cavity 61, while branch 55 is connected to a smaller cylindrical first stage diaphragm cavity 61A. Cavity 61A is about ½ the diameter of that of the larger cavity 61. The cavity 61 is covered by a thin flexible diaphragm 62 which is held in place by ring 64. Ring 64 is screwed or otherwise attached to block 51.

Note that all diaphragms 62,62A,82,82A are mounted vertically (i.e. perpendicular to the plane of the drawing in the top view of FIG. 3) to minimize the effect of gravity. On top of the diaphragm 62 is an aluminum disk 63 riveted to the center of the diaphragm 62.

The disk 63 serves as a rigid body through which the force of low pressure air can be concentrated. The rivet 65 has a recess on its head in which a piece of rubber 66 is inserted. This serves as a stopper for the nozzle 77 of the proximity pneumatic transducer 70.

Similarly, the branch 55 is connected to the smaller cylindrical first stage diaphragm cavity 61A. The cavity 61A is covered by diaphragm 62A on top of which is riveted a smaller aluminum disk 63A. The rivet 65A has a recess on top by which a piece of rubber 66A is attached to serve as stopper for the nozzle 77A of the contact pneumatic transducer 70A. Diaphragm 62A is held in place by ring 64A which is screwed to block 51.

Directly over the rivet stopper 66 is nozzle 77 of proximity transducer block 71; directly over the rivet stopper 66A is nozzle 77A of contact transducer block 71A. The pneumatic transducers 70 and 70A are identical in internal parts and function. The identical parts are marked by the same number but the parts of contact transducer 70A are labeled "A" in FIG. 3 to distinguish one transducer from the other.

Air 79 at about 0.5 to 1.0 psi is supplied to proximity transducer 70 through the threaded inlet 72 where a hose fitting can be attached. From the port 72 air flows into passage 73, then to venturi orifice 74, then to enlarged passage 78 and on to exit at nozzle 77. At the outlet of the venturi 74 is a branch passage 75 that leads to second stage diaphragm cavity 81. The second stage cavity 81 is covered by diaphragm 82 on top of which is riveted an aluminum disk 83. The rivet 85 has an elongated head which acts as a contact to actuate a light force microswitch, shown schematically as 86. The microswitch used in the preferred embodiment is Matsushita No. AM 4114 810, available from Matsushita Engineering and Service Company of Santa Fe Springs, Calif.

The flexible diaphragm 82 is held in place by an aluminum ring 84 which is screwed or otherwise affixed to the proximity transducer block 71. If pressure inside the first stage cavity 61 is low, nozzle 77 will open. Air 79 then will flow freely through venturi orifice 74. A partial vacuum will be created at branch 75, as well as in the diaphragm cavity 81. The second stage diaphragm 82 will be pushed by atmospheric pressure into the cavity 81, which will disengage the rivet 85 from the microswitch 86. On the other hand, if air 59 of a higher pressure causes nozzle 77 to be blocked by rivet stopper 66, pressure will build up in the branch 75 and in second stage cavity 81. The increase in cavity volume will push the diaphragm 82 out, actuating the microswitch 86. Two stages of cavities are generally necessary since the pressure changes from the nozzle 14 will not normally be enough to allow direct connection of, say, rivet 65 to microswitch 86. The pneumatic transducer 70 with second stage cavity 81 allows amplification of this weak pressure signal.

The contact pneumatic transducer 70A functions in the same manner as proximity transducer 70. Air 79A is supplied to contact transducer 70A through the threaded inlet 72A where a hose fitting can be attached. From the port 72A air 79A flows into passage 73A, then to venturi orifice 74A, then to enlarged passage 78A, and on to exit at nozzle 77A. At the outlet of the venturi 74A is a branch passage 75A that leads to second stage diaphragm cavity 81A. The second stage cavity 81A is covered by diaphragm 82A on top of which is riveted an aluminum disk 83A. The rivet 85A has an elongated head which acts as a contact to actuate a standard microswitch, shown schematically as 86A.

The flexible diaphragm 82A is held in place by an aluminum ring 84A which is affixed to the transducer block 71A. If pressure inside the first stage 61A is low, nozzle 77A will open. Air 79A then will flow freely through venturi orifice 74A. A partial vacuum will be created at branch 75A, as well as in the diaphragm cavity 81A. The second stage diaphragm 82A will be pushed by atmospheric pressure into the cavity 81A, which will disengage the rivet 85A from the microswitch 86A. On the other hand, if air 59 of a higher pressure causes nozzle 77A to be blocked by rivet stopper 66A, pressure will build up in the branch 75A and in second stage cavity 81A. The increase in cavity volume will push the diaphragm 82A out, actuating the microswitch 86A.

Thus, when the undersize detection nozzle 14 of FIG. 1 is in contact with the film tube 5, pressure will build up in the first stage diaphragm cavities 61,61A to block and actuate both transducers 70 and 70A at the sides of block 51. Therefore, during such contact, the microswitches 86,86A will both be actuated through increases in volume of second stage cavities 81,81A. The respective solenoid valves or relays must be connected to the normally closed side of the microswitch terminal (see the discussion of FIG. 6 below).

When the undersize air jet nozzle 14 is about 0.005 inch away from the film tube 5, only proximity transducer 70 will have enough pressure built up in cavity 81 to be actuated.

When the nozzle 14 is about 1/16 inch from the film tube 5, neither proximity transducer 70 nor contact transducer 70A will have enough pressure built up in the second stage cavities 81,81A to be actuated.

Therefore, the nozzle 14 is seen to have a dual range detection control. The transducer 70A is designed for contact control in that it will be actuated only while the film tube 5 is in contact with nozzle 14. The transducer 70 is designed for proximity control. Proximity transducer 70 will remain actuated until the tube 5 passes out of the acceptable proximity range of about 1/16 inch from the nozzle 14. As will become clear in connection with the discussion of FIG. 6, the dual range of control allows air 21 to be injected at one rate (i.e. at a first pressure) when the nozzle 14 just loses contact and at faster rates (due to a higher second and third pressure) when the nozzle 14 loses both contact and proximity to the tube 5.

The pressure amplification transducer assembly 90 for oversize detection purposes (shown schematically in FIG. 6) is constructed in much the same way as undersize transducer 50 of FIG. 3, except that the larger first stage cavity 61 is absent, together with its associated pressure transducer 70. This is because there is little or no need for a dual range of control in the case of oversize detection. Assembly 90 is conneoted by air hose 17 to oversize detection nozzle 15. When the tube diameter is of the correct size 9, oversize nozzle 15 is positioned in proximity with, but not in contact with, tube 5. If the tube 5 becomes oversized, i.e. increases in diameter beyond the control diameter size 9, it comes into contact with nozzle 15. Oversize transducer assembly 90 translates the resultant change in pressure into a microswitch signal to reduce air volume in the tube in much the same way transducer 50 signals the need for an *increase* in air volume in tube 5. Since there are only two operable conditions in the case of oversize detection, contact or no contact, there is no need for dual pressure transducers, although they easily could be provided.

FIG. 4 shows an alternative embodiment, an electronic/pneumatic undersize detection transducer assembly 250, which can be used to replace the second stage pneumatic transducers 70,70A which are used for pressure amplification in assembly 50. Part 266 is a solid state transducer where 267 and 268 are its terminal wires. Part 266A is another solid state transducer where 267A and 268A are its terminal wires.

The central block or body 251 serves as a base for solid state transducers 266 and 266A to be attached. Low pressure air 259 goes into the central block 251 through inlet 252 where a threaded port is provided for the attachment of a hose fitting. The air then goes into passage 253 and on to venturi 254. From the venturi orifice 254 air flows into enlarged passage 258 and out of outlet 257 where a threaded port is also provided for the installation of a hose fitting. Air 259 then passes from the hose fitting to the air hose 16 and finally to the undersize detection nozzle 14.

Branch passages 255,256 lead to cavities 261A,261. Diaphragms 262,262A, rigid disks 263,263A, and rings 264,264A function in the same manner as do corresponding parts previously described. Instead of using rivets, solid state transducers 266,266A are directly connected to their corresponding diaphragms by stems 265,265A.

The two transducers 266,266A can be used to replace the two pneumatic transducers 70 and 70A of FIG. 3, respectively. However, a power source, amplifier, a comparator circuit with its own power supply and output circuit (not illustrated) are necessary to replace the microswitches 86,86A. The use and construction of such electronic control equipment for solid state transducers such as 266 and 266A is known, but such substitution would significantly increase the complexity and cost of the blown film tube control apparatus and is not used in the preferred embodiment.

FIG. 5 shows an alternative embodiment, another electronic/pneumatic undersize detection transducer apparatus 350. Pressure from the branch 356 can be connected directly into the internal sensor of a standard solid state pressure transducer 361 where 362 and 363 are its terminal wires, thus eliminating the need for a first stage cavity and diaphragm. If desired another such transducer 361 could be connected to branch 355 instead of the pressure gauge 372 that is shown, to make assembly 350 a dual electronic transducer, dual range switching device, similar to the embodiment of FIG. 4, but without cavities 261,261A.

The central block or body 351 serves as a base for solid state transducer 361 and pressure gauge 372 to be attached. Low pressure air 359 goes into the central block 351 through inlet 352 where a threaded port is provided for the attachment of a hose fitting. The air then goes into passage 353 and on to venturi 354. From the venturi orifice 354 air flows into enlarged passage 358 and out of outlet 357 where a threaded port is also provided for the installation of a hose fitting. Air 359 then passes from the hose fitting to the air hose 16 and finally to the undersize detection nozzle 14.

In the embodiment of FIG. 5, branch 355 is connected via fitting 370 and hose 371 to a pressure gauge 372. In simplified form, two photosensors 373,377 are installed on gauge 372 to be actuated by the dial pointer 375. If a pressure gauge 372 is equipped with paired photosensors 373,377 in this manner, the branch 356 and the electronic pressure transducer 361 will not be necessary, but have been included in FIG. 5 for purposes of demonstrating the manner in which alternate embodiments may be combined.

Pressure changes can be communicated to relays as the pointer 375 of the gauge 372 blocks and unblocks the light paths between light sources 374,378 and the photosensors 373,377 located on the dial 376.

Oversize electronic or electronic/pneumatic transducer assemblies could be constructed out of any similar mix of parts as found in FIGS. 4 and 5 without departing from the spirit and scope of the invention. In such assemblies, the only difference would be the lack of need for more than one venturi branch passage with associated pressure measuring device, since there is no need for a dual oversize control range.

FIG. 6 is a schematic view of the pneumatic and electric connections found within the preferred embodiment of control box 23 of FIG. 1.

Filtered air at about 75 psi is passed into inlet air hose 28, through main valve 27, and then on to regulator 110. Main valve 27 has an associated pressure gauge 111. From regulator 110 air is distributed by air hoses or tubes (generally designated 28) to other pressure regulators 112,113,114,115,116 and an air hose leading to needle valve 133.

Regulators 112 and 113 are very low pressure regulators with associated pressure gauges 122,123. From the regulator 112, air 59 at about 0.1 psi is passed to the central block 51 of the undersize pressure amplification transducer assembly 50 and then out to connecting hose 16. Air from regulator 113, also at a low pressure of about 0.1 psi, is passed to the central block 91 of oversize pressure amplification assembly 90 and then out to hose 17. Hose 16 is connected to the undersize detection 14 and hose 17 is connected to the oversize detection nozzle 15.

The assembly 90 for oversize detection will be actuated only when the film tube 5 comes into contact with nozzle 15. This will avoid false signals due to the swaying of the film tube 5 by the cooling air current 22. As noted above, the assembly 90 is constructed in the same way as assembly 50 of FIG. 3 except that counterparts to the block 71 and microswitch 86 of amplification assembly 50 are absent in amplification assembly 90, as the latter is for proximity sensing purposes only. Assembly 90 has one pneumatic transducer 92, with an associated microswitch 93, which is attached to block 91.

Regulator 114 has an associated pressure gauge 124. Air at about 0.5 to 1.0 psi is distributed from regulator 114 to transducers 70,70A,92 as a means of pneumatic power amplification of the first stage pressure passing through blocks 51,91. This actuates the microswitches 86,86A,93 in the manner previously described.

A multiple range of undersize inflation pressures is obtained as follows. Pressure regulator 115 is associated with gauge 125. Air at low pressure, 0.5 to 1.0 psi, from regulator 115 is used to inflate the film tube 5 when a very slight shrinkage of about 0.005 inch is detected by undersize nozzle 14. Such slight shrinkage may be due to a number of factors encountered in normal operation of the blown film tube apparatus 1, including changes in ambient pressure due to changes in temperature in the workplace. The volume of air flow from regulator 115 is controlled by needle valve 131 before passing thru solenoid valve 142 and then to outlet hose 18. Hose 18 leads air 21 to the interior of film tube 5 (FIG. 1). It is to be noted that in the embodiment illustrated in FIG. 6 all solenoids are of the normally closed type.

Part 116 is another pressure regulator where 126 is the associated pressure gauge and 132 is a needle valve. The outlet pressure of about 5 to 10 psi from regulator 116 is used to inflate the film tube 5 when a larger diameter shrinkage, one that causes a gap of about 1/16 inch or more, is detected by the undersize nozzle 14. Such larger shrinkage could be caused by, e.g., pinholes or other similar causes of leaks of air from the film tube 5.

Needle valve 133 leads to a solenoid valve 144 which is operated by solenoid 144S. Valve 133 is directly connected to main regulator 110, whose output pressure is about 30 to 50 psi. From solenoid valve 144 the air line is connected to hose 18, which in turn is connected to the inside of the film tube 5. When starting the blown film tube apparatus 1 or when the film bubble bursts, a large amount of air is needed very quickly to blow up the bubble. As the film tube 5 approaches the desired diameter 9, the inflation rate must be slowed down. This is manually controlled by the operator through needle valve 133.

The needle valve 134 and solenoid valve 145 are connected to the high pressure inlet line leading directly from the main valve 27. When high pressure air flows through the internal venturi orifice of an air ejector 151, a drop in pressure across the orifice creates a partial vacuum or suction in the branch passage or the suction port of the air ejector 151 in a like manner to the kind described in detail in connection with assembly 50 of FIG. 3. The suction port of 151 is connected by hose 147 to solenoid valve 146 and then to the inside of film tube 5 by hose 18. Part 152 is a vacuum gauge. The solenoids 145S,146S of valves 145,146 are electrically connected so that they are always energized simultaneously. Therefore, valves 145 and 146 always open and close at the same time.

Electricity is suppled to the control box 23 by the line 32. Part 154 is a toggle switch and 155 and 156 are fuses. Line 127 is the energizing line of the electrical devices of control box 23.

To operate the controller mechanism of the present invention, one first opens main air valve 27 and closes main switch 154. After molten plastic has started to come out of the annular ring of the die 2 one closes switch 138 to supply current to solenoid 144S which opens valve 144 and lets high pressure air 21 into the die 2. The air 21 blows up the bubble until it is manually transported to and taken up by nip rolls 7 to form into a two layer thin film tube web 8.

When the tube 5 has attained the desired diameter size 9, adjustable position nozzles 14 and 15 are moved into position by the operator. At this time, the operator closes switches 137 and 139 to supply current to the oversize and undersize transducer microswitches 86,86A,93. Switch 139 separately controls power to microswitch 93.

If the tube size then shrinks from the control size diameter 9 due to air volume loss incident to normal operation, detection and correction is necessary. Once a gap of about 0.005 inch is created between the tube and the undersize nozzle 14, air leaking from the nozzle 14 will cause contact transducer 70A to close microswitch 86A to complete a circuit to solenoid 142S which, in turn, opens valve 142 to allow low pressure air 21 to flow into the film tube 5 through line 18. When the film tube 5 attains the right size diameter 9, nozzle 14 comes again into light contact with film tube 5. This contact will open microswitch 86A and close the solenoid valve 142 to stop air 21 from flowing into the film tube 5.

If leaks due to pinholes or other means causes the inflow of low pressure air 21 to be insufficient to reinflate the tube 5, a gap of about 1/16 inch will open up between the tube and nozzle 14. This will cause the proximity transducer 70 to close microswitch 86 which completes the electrical circuit to solenoid 143S. The opening of solenoid valve 143 allows medium pressure air 21 into hose 18 and into the film tube 5. This will cause more rapid inflation of the tube 5 to allow diameter correction to occur faster than the loss caused by leakage.

Meanwhile, the electric line from microswitch 86 is also connected to relay 141 and delay relay or timer 148. When solenoid 143S is on, relay 141 and delay relay 148 are also on. When relay 141 is on, current to solenoid 142S is cut off because the normally contacting poles will move out of position while the normally open poles will be closed. The closing of the normally open poles will switch on a signal or alarm 161 to warn the operator that large size deviation is occurring. Once the film tube 5 has regained the correct size diameter 9, light contact with the nozzle 14 will open the contacts of microswitches 86,86A.

If the bubble fails to return to the right size after the lapse of a preset time for the delay relay 148, its contact will be closed and solenoid 144S will be energized to inject high pressure air into the film tube 5 until the bubble regains its former size.

In the case where, before the lapse of the preset time for delay relay or timer 148, a pinhole develops into a tear or large hole and the tube diameter continues to shrink at a fast speed despite receiving medium pressure air via valve 143, the operator can close switch 138 to open solenoid air valve 144S and thus allow high pressure air into the film tube 5 without waiting for the time to lapse for the delay relay 148 to function.

If due to operator error, change in ambient pressure, leaks in the solenoid valves or other factors, the film tube 5 becomes oversized, nozzle 15 will come into contact with the film tube 5 and cause the microswitch 93 to close and to energize both solenoid 145S and 146S, thus opening valves 145,146. High pressure air flowing into air ejector 151 and out air exhaust 31 will then create suction in line 18 to reduce the air inside the film tube 5. The noise from the air ejector 151 will also warn the operator of oversize detection.

When a smaller diameter of film tube is desired, the operator can manually close switch 140 to energize solenoids 145S and 146S to reduce the film tube diameter in the same manner as accomplished through the automatic operation just described.

FIG. 7 is a plan view of a sizing ring 190 taken from the top, which ring, in an alternate embodiment of my invention, serves to replace nozzles 14,15 as the means for detecting undersize or oversize film tube diameters through pressure changes. FIG. 8 is a sectional view of the sizing ring of FIG. 7.

Sizing ring 190 has an air channel 191 provided on its inner surface or wall 193. Hose fitting 192 is provided to allow the connection of a low pressure air supply to the air channel 191 via air passage 195. Grommets 194 allow ring 190 to be adjustably connected to a frame (not illustrated) of the blown film tube apparatus 1 of FIG. 1. For the film processor who desires to produce a fixed size of tube, sizing ring 190 may be found to be a good substitute for the iris ring 24 and movable size detection nozzles 14,15 of FIG. 1. The ring 190 serves as the film tube 5 stabilizer in place of the iris ring 24 and the air channel 191 serves as a substitute for a detection nozzle 14 or 15. For undersize detection, a ring 190 of the same or a slightly smaller internal diameter as that of the desired tube diameter 9 will be used. For oversize detection, a ring 190 that has an internal diameter slightly larger than the tube diameter 9 will be used.

The sizing rings would be installed at the position where the iris ring 24 of FIG. 1 is installed. The undersize sizing ring would preferably be installed above the oversize sizing ring.

When the film tube 5 is of the correct diameter 9, the internal pressure of the tube 5 forces the the wall of the tube to come into contact with internal wall 193 of an undersize detection ring and seal off the air leak from the air channel 191. If the film tube 5 is undersize, air will leak from the air channel and will cause the undersize detection system previously described to react and to supply air 21 into the tube 5 until the tube is of the correct size diameter 9.

When the film tube is oversize, the film tube 5 will come into contact with the wall 193 of an oversize sizing ring 190 and seal off the low pressure air in the air channel 191, causing the oversize detection system previously described to react and to suck air out of the inside of the tube 5.

Although an air channel ring for undersize detection may offer much higher sensitivity than a nozzle, it will lose the functioning of the proximity detection sensor of the pressure transducer 70. However, a delay relay (not shown) can be connected in parallel to the low pressure solenoid valve 142S to activate medium pressure solenoid valve 143S after lapse of a preset time to make up for the loss of proximity detection.

The air channel ring is a very accurate detection device for oversize detection as false signals due to swaying of the bubble are not possible. Unless the air channel is fully covered there will be no signal or activation of the oversize transducer 90.

Note that the air channel 191 could be eliminated and replaced by a simple air passage 197 in a sizing ring 196 leading to an outlet, like the nozzle face outlet 44 of FIG. 2. Such an air passage would be placed in line with the hose fitting 198, as shown in FIG. 9.

A good combination would be to use the ring 196 with air passage 197 for undersize detection purposes and a ring 190 with air channel 191 for oversize detection. The choice will depend on the desired accuracy of the processor.

In summary, it can be seen that the blown film tube diameter control apparatus and method of the present invention is surprisingly simple, inexpensive and efficient. Electronic parts are minimized and computerized control is not necessary.

While the above provides a full and complete disclosure of the preferred embodiments of this invention, various modifications, alternate constructions, and equivalents may be employed without departing from the true spirit and scope of the invention. For example, the sizing ring can be used in size detection and control when making plastic pipes and tubes and other continuously extruded or pultruded products. Therefore, the above description and illustrations should not be construed as limiting the scope of the invention which is defined by the appended claims.

I claim:

1. A blown film tube diameter control apparatus including:
    a die for extruding blown film;
    at least one fluid nozzle terminating in an outlet having a planar flat contact face, the face disposed in at least one position of the blown film in light contact with and extending parallel to the plane of an exterior wall of the film above the frost line of the film;
    pressure sensing means for signalling the pressure of a fluid passing through the at least one nozzle and impinging on the exterior of the blown film when the film is in a first position and for signalling the pressure of the impinging fluid when the film is in at least one second position; and
    controlling means for adjusting the position of the film in response to signals from the pressure sensing means.

2. The apparatus of claim 1 wherein:
    the contact face is coated with tetrafloroethylene.

3. A blown film tube diameter control apparatus including:
    a die for extruding blown film;
    at least one fluid nozzle;
    first pressure sensing means for signalling pressure changes in a fluid passing through the at least one nozzle and impinging on the blown film;
    controlling means for adjusting the flow of air through the die into the blown film in response to signals from the first pressure sensing means; and
    wherein the first pressure sensing means includes
        at least one central fluid venturi block having
            a central fluid passage,
            a constricted central venturi orifice in the central fluid passage,
            at least one central branch passage branching off the central passage at the central venturi orifice, and
            second pressure sensing means attached to the at least one central branch passage for signalling pressure changes in the central passage to the controlling means.

4. The apparatus of claim 3 wherein:
    the second pressure sensing means includes
        at least one central cavity chamber in the centr
        block at an end of the at least one central br passage distal to the central venturi orifice, each central chamber having
first means for increasing and decreasing the central chamber's volume in response to increases and decreases, respectively, in pressure in the central passage, and
third sensing means for signalling volume changes of the central chamber to the controlling means.

5. The apparatus of claim 4 wherein:
the first volume means is a flexible diaphragm covering each central cavity chamber.

6. The apparatus of claim 4 wherein:
the third sensing means is at least one solid state transducer.

7. The apparatus of claim 4 wherein:
the third sensing means includes
at least one second fluid venturi block, each second block having
a second fluid passage,
a second constricted venturi orifice in the second fluid passage,
a second branch passage branching off the second passage at the second venturi orifice, and
fourth pressure sensing means attached to the second branch passage for signalling pressure changes in the second passage to the controlling means.

8. The apparatus of claim 7 wherein:
there are two central branch passages,
there are two cavity chambers in the central block, and
there are two second venturi blocks.

9. The apparatus of claim 7 wherein:
the fourth pressure sensing means includes
a second cavity chamber in each second block at an end of the second branch passage distal to the second venturi orifice having
second means for increasing and decreasing the second chamber's volume in response to increases and decreases, respectively, in pressure in the second passage, and
a microswitch attached to the second volume means for sending a first signal to the controlling means at a first volume of the second chamber and for sending a second signal to the controlling means at a second larger volume of the second chamber.

10. The apparatus of claim 9 wherein:
the second volume means is a flexible diaphragm covering each second cavity chamber.

11. The apparatus of claim 3 wherein:
there are two central branch passages,
the second pressure sensing means attached to a first central branch passage signals pressure changes in the central passage in a first range of central passage pressures, and
the second pressure sensing means attached to a second central branch passage signals pressure changes in the central passage in a second range of central passage pressures.

12. The apparatus of claim 3 wherein:
the second pressure sensing means includes
at least one solid state pressure transducer.

13. The apparatus of claim 3 wherein:
the second pressure sensing means includes
at least one pressure meter having
an opaque pointer,
at least one light source, and
at least one photosensor, the pointer adapted to travel between the light source and the photosensor upon a change in pressure in the central passage to signal the controlling means.

14. A blown film tube diameter control apparatus including:
a die for extruding blown film;
at least one fluid nozzle;
at least one central fluid venturi block having
a central fluid passage connected by a fluid line to the at least one nozzle for passing fluid under pressure through the central passage and the nozzle onto the blown film,
a constricted central venturi orifice in the central fluid passage,
at least one central branch passage branching off the central passage at the central venturi orifice;
at least one central cavity chamber in the central block at an end of the at least one central branch passage distal to the central venturi orifice, each central chamber having
first movable diaphragm means for increasing and decreasing the central chamber's volume in response to increases and decreases, respectively, in pressure in the central passage;
at least one second fluid venturi block, each second block having
a second fluid passage for directing fluid under pressure onto the first moveable diaphragm means,
a second constricted venturi orifice in the second fluid passage, and
a second branch passage branching off the second passage at the second venturi orifice; and
pressure sensing means attached to the second branch passage for signalling pressure changes in the second passage.

* * * * *